United States Patent [19]

Chong et al.

[11] Patent Number: 4,594,158

[45] Date of Patent: Jun. 10, 1986

[54] FILTER AID MATERIALS BEARING ANION EXCHANGE RESINS

[75] Inventors: Berni P. Chong, Dresher; Eric G. Isacoff, Richboro, both of Pa.

[73] Assignee: Rohm and Haas, Philadelphia, Pa.

[21] Appl. No.: 298,866

[22] Filed: Sep. 3, 1981

[51] Int. Cl.$^4$ .............................................. B01D 37/02
[52] U.S. Cl. .................................. 210/193; 210/777; 210/504; 210/505
[58] Field of Search ............................... 210/503–505, 210/193, 777–778

[56] References Cited

U.S. PATENT DOCUMENTS 4,187,120 2/1980 Kunin et al. ........................ 210/193

Primary Examiner—Ivars Cintins
Attorney, Agent, or Firm—John E. Taylor, III

[57] ABSTRACT

Conventional filter aid materials are treated with anion exchange resin materials having particle diameters smaller than 1 micrometer to produce an improved filter aid material bearing a fixed monolayer of the anion exchange resins.

8 Claims, No Drawings

FILTER AID MATERIALS BEARING ANION EXCHANGE RESINS

BACKGROUND OF THE INVENTION

This invention relates to improved, cation-particle-coated filter aid materials for filtration application. In particular it relates to filter aid materials coated with anion exchange resins having particle sizes of 0.05 to 1 micrometer in diameter, electrostatically bound to the surface of the filter aid material.

Filter aids are well-known in the filtration art. They are solid materials, insoluble in the liquid to be filtered, which are added to the liquid or are coated upon a filter or filter support, their purpose being to speed filtration, reduce fouling of the filter surface, reduce cracking of the filter layer, or otherwise to improve filtration characteristics. Materials which are frequently used as filter aids include cellulose fibers, diatomaceous earth, charcoal, expanded perlite, asbestos fibers and the like.

Filter aids are often treated to improve their effect upon the filter. They have been treated with soluble polyelectrolytes to change their surface characteristics, as described by Halbfoster in U.S. Pat. No. 4,190,532. They also have been modified chemically to give them ion exchange properties, as described by Kressman in British Pat. No. 1,123,908, or mixed with ground ion exchange resins having particle sizes of about 40 to 250 micrometers, and the resulting mixture used as a filter aid, as described by Halbfoster, above, or Kunin et al., U.S. Pat. No. 4,187,120, or in British Pat. No. 1,455,692.

Filters are often prepared from flocculated mixtures of cation and anion exchange resins, either ground, conventional resins as taught in U.S. Pat. Nos. 3,250,702 and 3,250,703, or from emulsion polymer ion exchange resins, as taught in U.S. Pat. No. 4,200,695. These flocs are coated on filter supports, and are used for removal of colloidal and dissolved solids from water and other aqueous process streams. A major problem of filters using these filter media is a tendency for the filter layer to crack during use, which leads to particulate leakage and fouling of the filter support. Fibrous filter-aid material deposited on top of the filter layer significantly aids in the prevention of such cracks, thereby protecting the filter support and prolonging the useful life of the filter layer.

We have now discovered that cationic particles bearing anion exchange functional groups, and having a particle size of from about 0.05 to about 1 micrometer in diameter, coated upon the surface of conventional filter aid materials, produces a cation-particle-coated filter aid material which is superior for many applications. Such cationic particles bind themselves electrostatically to the negatively charged surface which forms on filter aid materials when they are wet with water. The electrostatic bond thus formed is sufficiently strong to resist resin-particle separation from the surface of the filter aid material during rinsing or other treatment, this strong bonding being in marked contrast to the behavior of larger charged particles in contact with filter aid materials, as described in the above references. The particles, once bound, are essentially irremovable from the filter aid surface.

As used herein, the term "cation-particle-coated filter aid" refers to the materials of the present invention, bearing a surface coating of the fine cationic particles described above bound tightly to the filter aid by the electrostatic charges. The cationic particles themselves are also known as anion exchange resins, and are designated herein interchangeably as cationic particles and as anion exchange resins, because they possess not only a cationic charge, but anion exchange functional groups in their insoluble polymer structure.

Cation-particle-coated filter aids possess a high surface area of active anion-exchange sites, for wherever the small cationic particles of anion resins are not in contact with the filter aid they are available for both adsorption and anion exchange. Surprisingly, cation-particle-coated filter aid materials permit a significant increase in the total filtration capacity of a filter comprising an ion exchange resin floc and a coating of cation-particle-coated filter aid over such a filter overcoated with conventional filter aids.

The conventional filter aids useful in preparing the materials of the present invention are well-known to those familiar with the filtration art. They include, but are not limited to, cellulose fibers, including those cellulose fibers which have been variously treated with commercial surface treatments, asbestos fibers, polyacrylonitrile fibers, charcoal, diatomaceous earth and expanded perlite. The cation particles of this invention are those particles bearing anion exchange functional groups and having a very fine particle size; the preferred particle size is from about 0.05 to about 1 micrometer, and a more preferred particle size is from about 0.05 to about 0.2 micrometers. Smaller particle sizes encourage tighter bonding between the anion exchange resin particles and the surface of the filter aid materials. Strongly basic resins in this particle size range are preferred, and more preferred are those resins functionalized with quaternary amine functional groups.

The improved, cation-particle-coated filter aid materials of the present invention are prepared by mixing a dispersion of the resin particles in water with a slurry of the filter aid material in water. As these materials are mixed, the positively charged resin particles bind electrostatically to the negatively charged surface of the filter aid material until the surface is saturated. This saturation typically occurs when about 2% or less of the resin, based on the dry weight of the filter aid material, has bound itself to the filter aid surface. Until the surface has been saturated, the supernatant liquid in the mixture is clear; at saturation the excess resin particles remain free, and the supernatant liquid is cloudy. Once the materials have been combined, the cation-particle-coated filter aid may be rinsed to remove excess unbound resin, with no loss of the bound resin from the surface of the filter aid.

Once prepared, the cation-particle-coated filter aid materials of the present invention may be used for purposes similar to those of untreated filter aids; such uses are well-known in the art. Conventional flow rates and levels of application may be used as guides for determining the optimum conditions for a particular application.

Applicants do not wish to be bound to any one theory of operation of the present invention. Nevertheless, as an aid to understanding and using the present invention, it should be noted that all conventional filter aid materials usable in preparing the materials of the present invention, as well as many other insoluble materials, develop negative electrostatic surface charges. This development of a negative surface charge is a phenomenon of the electrostatic double-layer effect in water; a discussion of this effect may be found in Jirgensons et al., *A Short Textbook of Colloid Chemistry* (New York, Wiley, 1954). Anion exchange resins have a positive surface charge, i.e., they are cationic particles, in water, and are therefore attracted to available, negatively charged surfaces. The magnitude of these attractive forces is small when compared to the mass of conventional ion exchange resins, but as the particle size of the resins is decreased, the force per unit weight increases. For particles with sizes near or below one micrometer, the forces are large enough to bond the particles to appropriate surfaces firmly enough that they will not dislodge under conditions typically used for filtration applications. When conventional filter aids are coated with cationic resin particles smaller than one micrometer in diameter, the cationic particles will not be removed from the filter aid surface by rinsing or use.

The following examples are intended to illustrate the invention, and not to limit it except as it is limited in the claims. All percentages and other fractions are by weight unless otherwise specified, and all reagents are of good commercial quality. The emulsion ion exchange resins used in the examples are prepared as described in U.S. Pat. No. 4,200,695, which is hereby incorporated herein by reference.

EXAMPLE 1

This example illustrates the preparation of an improved, cation-particle-coated filter aid material according to the present invention, from a commercial cellulose fiber filter aid material. A 8.79 g sample of cellulose fiber filter aid (marketed commercially by The Brown Co., 650 Main St., Berlin, NH. 03570 as Solka-Floc SW-40) was slurried in 300 ml of water. To this 0.5 ml of an 8.8%-solids, aqueous suspension of quaternary amine-functionalized, strongly basic, emulsion anion exchange resin having an average particle diameter of 0.1 micrometer, was added. The mixture was shaken for one minute, and produced a clear supernatant liquid upon settling. The pH of this supernatant liquid, measured on a pH meter, was 9.6. The amount of emulsion anion exchange resin in the sample was 0.5%, based on the solid weight of filter aid and resin.

EXAMPLE 2

This example illustrates the preparation of an improved cation-particle-coated filter aid material according to the present invention from a commercial, treated filter aid material. A 94.8 g sample of 33.8% solids, cellulose fiber filter aid (marketed commercially by Ecodyne Corp. as "Ecocote") was slurried in 800 ml of water. The pH of this slurry was 6.0. A 2.0 ml portion of the emulsion anion exchange resin suspension described in Example 1 was added to the slurry and the mixture was shaken for 2 minutes. An additional 1.0 ml portion of the anion exchange resin was added, and the mixture was shaken for an additional 2 minutes. After standing at room temperature for 3 days, an additional 1.0 ml of the emulsion anion exchange resin was added and the mixture was shaken for 1 minute. The pH of the slurry was measured as 7.9. Upon settling, the supernatant liquid was clear. This material contained 1.1% resin, based on the dry weight of filter aid and resin.

EXAMPLE 3

This example illustrates the preparation of a cation-particle-coated filter aid material according to the present invention which contains more anion exchange resin than that of Example 2. A 36.6 g sample of the cellulose fiber filter aid described in Example 2 was slurried in 300 ml of water, and 2.0 ml of the emulsion anion exchange resin suspension described in Example 1 was added; the mixture was shaken for 1 minute. Upon settling, the supernatant liquid was clear and the pH of the liquid was 8.3. This sample contained 1.4% anion exchange resins, based on the dry weight of filter aid material and resins.

EXAMPLE 4

This example describes the preparation of a conventional cellulose fiber filter aid material treated with an amount of sodium hydroxide approximately equivalent to the hydroxyl functionality of the resin bound to the filter aid material in Example 1. The amount of hydroxyl functionality, but not the ion exchange capacity nor the presence of the finely divided cation particles of the cation-particle-coated filter aid materials is thus simulated. An 8.5 g sample of the cellulose fiber filter aid material used in Example 1 was slurried in 300 ml of deionized water. The pH of the supernatant water was measured as 6.7. A 2.0 ml portion of 0.1N sodium hydroxide solution was added, and the mixture was shaken; the pH of the resulting, supernatant liquid was 9.3.

EXAMPLE 5

This example illustrates the preparation of a conventional cellulose fiber filter aid material treated with a soluble, quaternary-amine-functionalized polymer, the resulting filter-aid material corresponding to materials of the prior art. The presence of anion exchange capacity, but not the cation particles of the cation-particle-coated filter aid materials, is thus simulated. A 8.5 g sample of the cellulose fiber filter aid material used in Example 1 was slurried in 300 ml. of water, and the pH of the supernatant liquid was determined to be 7.0. A sample of poly(diallyldimethylammonium chloride) having a molecular weight of 100,000 and marketed by Calgon Corp. under the trade name "Catfloc ®" was converted to the hydroxide form by treating it with a conventional, strongly basic anion exchange resin. A 0.15 g sample of a 1.83%-solids, aqueous solution of the polymer was added to the filter aid material and the mixture was shaken. The supernatant liquid had a measured pH of 9.3.

EXAMPLE 6

This example illustrates the use of the filter aids of the present invention as overcoats to aid in filtration with flocculated, finely divided ion exchange resins, and compares the filtration effectiveness of conventionally overcoated filters with those employing the filter aids of the present invention.

A floc was prepared from strongly basic and strongly acidic emulsion ion exchange resins according to U.S. Pat. No. 4,200,695; this floc was precoated, at a level of 0.037 g/cm$^2$ of filter area (0.075 lbs/ft$^2$), or a total of 18.6 g of floc on a dry basis, onto a polypropylene, spiral-wound filter support with an average pore size of 20 $\mu$m at the service flow rate of 0.015 liters/min./cm$^2$ (3.7 gpm/ft$^2$); the inlet pressure was maintained at approximately 34 kilo-Pascals (5 psig). The filter aid material was coated onto the deposited floc at a level of 0.016 g/cm$^2$ (0.033 lb/ft$^2$), or 8.18 g of dry filter aid material, at the same flow rate.

A suspension of approximately 1000 parts per billion hematite (Fe$_2$O$_3$) having a particle size of 0.87 $\mu$m was prepared in water deionized to a conductivity of $10 \times 10^6$ ohm-cm, and this suspension was filtered through the filters prepared as described above at the 0.015 liters/min/cm² flow rate, but at a pressure of 170 kPa (25 psig). The pressure drop across the filters was monitored during the run, and the hematite leakage was monitored by passing 250-ml samples of the filtrate through 0.45-μm filters (Millipore Corp.); at the appearance of a slight yellow color on the filters, corresponding to about 10% leakage as measured by atomic absorption spectrometry, the run was terminated. The hematite removal by the filters being tested was determined by atomic absorption spectrometry, and is recorded as total grams of hematite removed.

Table I summarizes the results of the above test with both the improved filter aids of the present invention and conventional filter aids.

TABLE I

| Example Describing Filter Aid | Filter Aid Application Level | Time to 10% Leakage | Pressure Drop at 10% Leakage | Filtration Capacity at 10% Leakage |
|---|---|---|---|---|
| Ex. 4 | 0.016 g/cm² | 1350 min | 28 kPa | 0.25 g |
| Ex. 5 | 0.016 g/cm² | 1300 min | 41 kPa | 0.20 g |
| Ex. 2 | 0.016 g/cm² | 2554 min | 38 kPa | 0.34 g |
| Ex. 1 | 0.016 g/cm² | 3255 min | 34 kPa | 0.47 g |
| Untreated Ecocote | 0.024 g/cm² | <30 min | 14 kPa | <0.01 g |
| Untreated[1] Ecocote | 0.073 g/cm² | 3200 min | 69 kPa | 0.21 g |
| Ex. 3[1] | 0.024 g/cm² | 4690 min | 69 kPa | 0.29 g |

[1]Note:
The filter support was precoated with 0.073 g/cm² of a floc prepared by mixing 12.39 g of ground, strongly basic resin with 24.79 g of ground, strongly acidic resin in 250 ml of deionized water and "smoothing" the resulting floc by the addition of 12 ml of 0.1% polyacrylic acid solutions. The ground resins are marketed commercially by Ecodyne Corp., Graver Water Division, under the respective designations Powdex ® OH and Powdex ® H; these ground resins have a median particle diameter of about 20 μm and a very broad particle size distribution. The polyacrylic acid solution is marketed commercially by Rohm and Haas Company, under the designation Acrysol ® ASE-108.

From the above examples it may be seen that the materials of the present invention, i.e., the cation-particle-coated filter aids of Examples 1, 2 and 3, possess significantly longer service lives and higher filtration capacities than the conventional filter aids of Examples 4 and 5 and the untreated filter aids. The comparison of untreated overcoat material with the cation-particle-coated filter aid material of the present invention (the last two lines of Table I) clearly shows the superiority of a smaller amount of cation-particle-coated filter aid over a larger amount of conventional material. Note that, because the filter precoat in this comparison was different from that of the preceding runs, the results of this comparison should not be compared directly with those of the preceding runs.

We claim:

1. An improved filter comprising as a precoat layer a floc of finely divided anion exchange resin and cation exchange resin, and an overcoat layer deposited thereon, the overcoat layer comprising a filter aid and coated irremovably upon the surface thereof, by electrostatic bonding, finely divided anion exchange resin particles having an average particle diameter between about 0.05 and about 1 micrometer.

2. The improved filter of claim 1 wherein the anion exchange resin particles bonded to the filter aid have a particle diameter between about 0.05 and about 0.2 micrometers.

3. The improved filter of claim 1 wherein the filter aid is selected from the group consisting of cellulose fibers, asbestos fibers, polyacrilonitrile fibers, charcoal, diatomaceous earth and expanded perlite.

4. The improved filter of claim 3 wherein the filter aid is polyacrilonitrile fibers.

5. The improved filter of claim 3 wherein the filter aid is cellulose fibers.

6. A method of preparing an improved filter aid composition which comprises mixing in aqueous suspension a filter aid with anion exchange resin particles having a diameter of from about 0.05 to about 1 micrometer until the particles have become irremovably bound to the surface of the filter aid, and thereafter removing any unbonded anion exchange resin particles from the filter aid composition.

7. The method of claim 6 wherein the amount of anion exchange resin particles deposited is sufficient to saturate the surface of the filter aid.

8. The method of claim 6 wherein the resin particle diameter is from about 0.05 to about 0.2 micrometers.

* * * * *